April 19, 1960 N. A. SCHUSTER 2,933,674
WELL LOGGING SYSTEMS
Filed Aug. 6, 1956 4 Sheets-Sheet 1

INVENTOR.
NICK A. SCHUSTER
BY William R. Sherman
HIS ATTORNEY

April 19, 1960 N. A. SCHUSTER 2,933,674
WELL LOGGING SYSTEMS
Filed Aug. 6, 1956 4 Sheets-Sheet 2

INVENTOR.
NICK A. SCHUSTER
BY William R. Sherman
HIS ATTORNEY

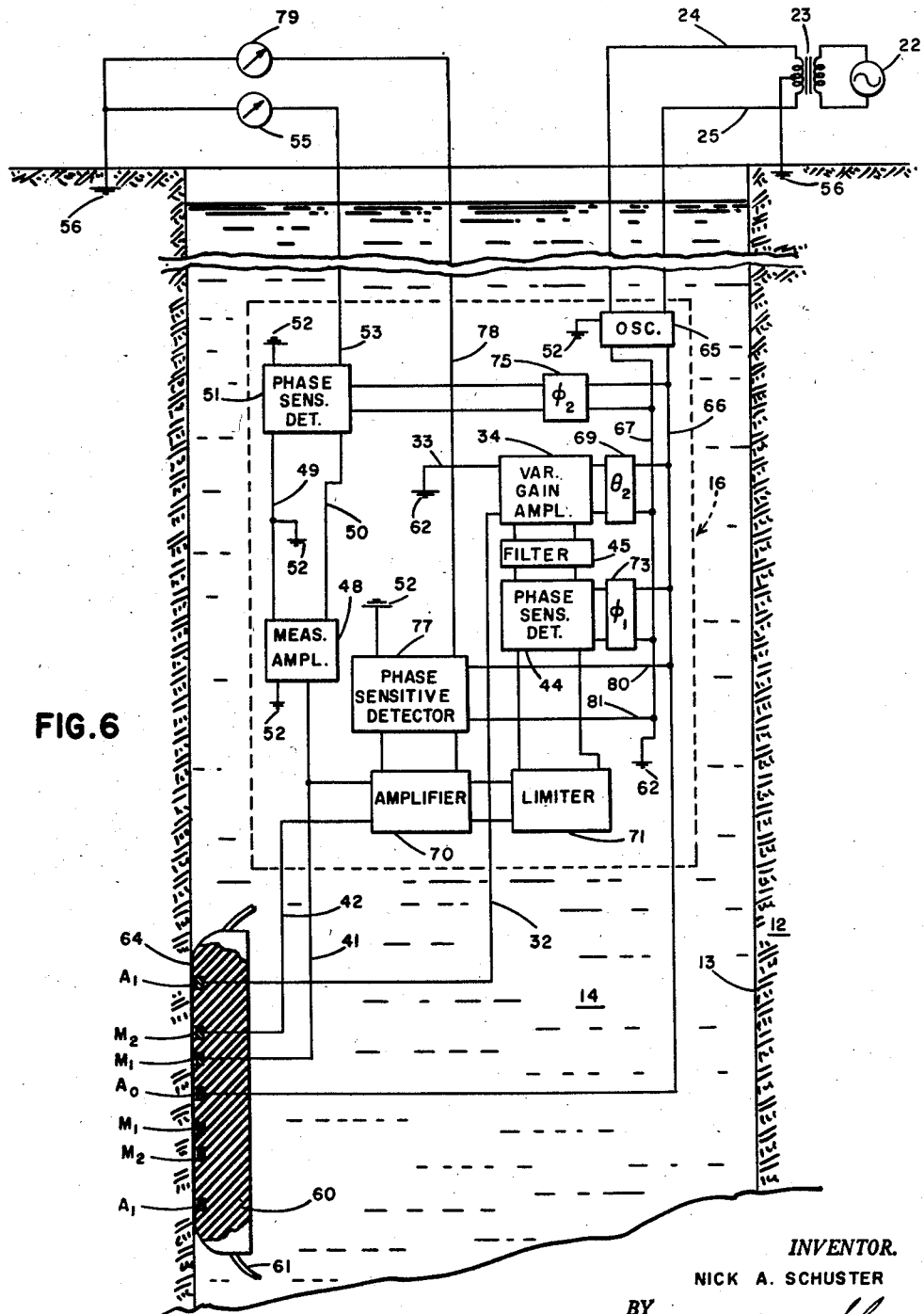

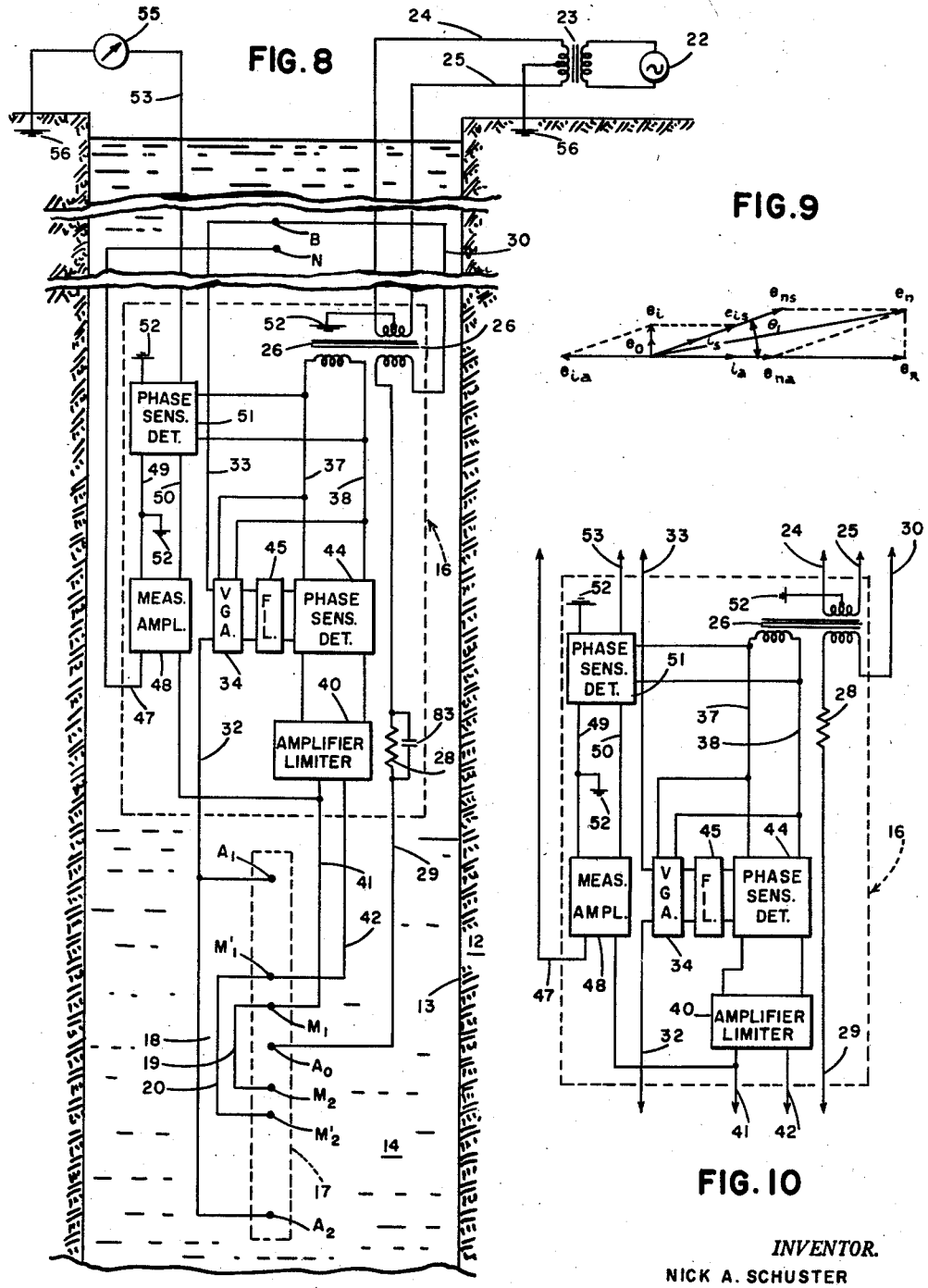

United States Patent Office 2,933,674
Patented Apr. 19, 1960

2,933,674

WELL LOGGING SYSTEMS

Nick A. Schuster, Houston, Tex., assignor, by mesne assignments, to Schlumberger Well Surveying Corporation, Houston, Tex., a corporation of Texas Application August 6, 1956, Serial No. 602,197

24 Claims. (Cl. 324—1)

The present invention relates to the electrical investigation of earth formations traversed by a borehole, and more particularly, to new and improved systems for controlling the potential and current distributions in the earth formations adjacent to an electrical logging array passed through the borehole.

It has become accepted practice to obtain electrical resistivity logs of the earth formations traversed by a borehole by automatically controlling potential and current distributions in the vicinity of an electrical logging array which is passed through the borehole. Resistivity or conductivity indications obtained as a result of such automatic control are more nearly representative of the actual resistivity or conductivity sought to be measured. Exemplary systems employing this type of automatic control are disclosed in H. G. Doll Patent Nos. 2,712,627, 2,712,628, 2,712,629, and 2,712,630, and M. C. Ferre Patent No. 2,712,631, all issued July 5, 1955. In these systems, a constant surveying current emitted by a main electrode in the borehole is confined to a path substantially perpendicular to the borehole wall by auxiliary current emitted on opposite sides of the main electrode. Feedback amplifier means responsive to the potential difference between a pair of points differently spaced near the main electrode controls the magnitude and polarity of the auxiliary current so as to reduce the potential difference substantially to zero. Such systems have proved highly successful, although care is required to maintain system stability under very severe borehole conditions.

Systems have been disclosed in copending application Serial No. 529,016, filed August 17, 1955 by N. A. Schuster for alleviating the design requirement for severe conditions by effectively controlling the feedback loop gain. An information signal is employed in these systems distinguishable from the survey and auxilitry currents to reduce the gain of the feedback amplifier means when the formation conditions would otherwise lead to an excessively high feedback loop gain.

It is an object of the present invention to provide novel and improved apparatus of the above character in which the demands made on the amplifying means under extreme borehole conditions are not as severe as they sometimes were in the previous practice.

Another object of the invention is to provide novel and improved apparatus of the above character in which the design requirements for the amplifying means are alleviated without requiring the use of a distinguishable information signal.

Another object of the invention is to provide novel and improved apparatus of the above character, wherein the gain of the automatic control loop is maintained substantially constant despite large and rapid variations in borehole conditions.

A further object of the invention is to provide new and improved apparatus of the above character for deriving resistivity indications having a character determined in accordance with the phase relationships of logging signals.

Yet a further object of the invention is to provide novel and improved apparatus of the above character for simultaneously deriving resistivity indications of differing character in an economical and effective manner.

In accordance with the present invention, survey current is passed from a main electrode into adjacent earth formations, while from an auxiliary electrode having portions on either side of the main electrode, auxiliary current is emitted by means of a variable gain amplifier. Within regulated limits, the gain of the amplifier is varied in accordance with a potential difference of given phase produced by the currents between a pair of points one of which is nearer the main electrode and the other nearer the auxiliary electrode. The range of gain variations is conveniently limited by means which limits excursions of the potential difference as supplied to the amplifier. By means responsive to the potential of a point in the vicintiy of the main electrode, there is derived a signal which may be given the same significance as resistivity signals derived according to the aforementioned patents.

In one form of the invention, the emitted auxiliary current is out of phase with the survey current by an angle which is less than 180°. The components of potential difference produced at a given phase angle by the currents between the pair of points is balanced to maintain the resultant potential difference having this phase angle at substantially zero. In another form of the invention, elongated current emitting and potential measuring electrodes are employed of the type disclosed in Doll Patent No. 2,712,628. In another form, the system is arranged for deriving simultaneous indications of resistivity having distinctive characteristics. In yet another form of the invention, only the phase of the survey current is shifted from a reference phase angle. This is accomplished by passing survey current from the main electrode having a portion in quadrature phase relation with the auxiliary current. In still another embodiment of the invention, certain of the advantages of the invention are derived without the introduction of phase shifts between the survey and auxiliary currents.

The invention may be better understood from the following detailed description of representative embodiments, taken in conjunction with the accompanying drawings in which:

Fig. 6 is a schematic diagram of a well logging system in accordance with another embodiment of the invention;

Fig. 8 is a schematic diagram of still another embodiment of the invention;

Fig. 9 is a vector diagram illustrating the phase relationships of signals in the systems of Fig. 8; and Fig. 10 is a schematic diagram of a well logging system according to yet another embodiment of the invention wherein the phase of the auxiliary current is not deliberately shifted relative to the survey current.

In the figures, like reference numerals are employed to designate similar parts.

Figures 1, 2, 5:
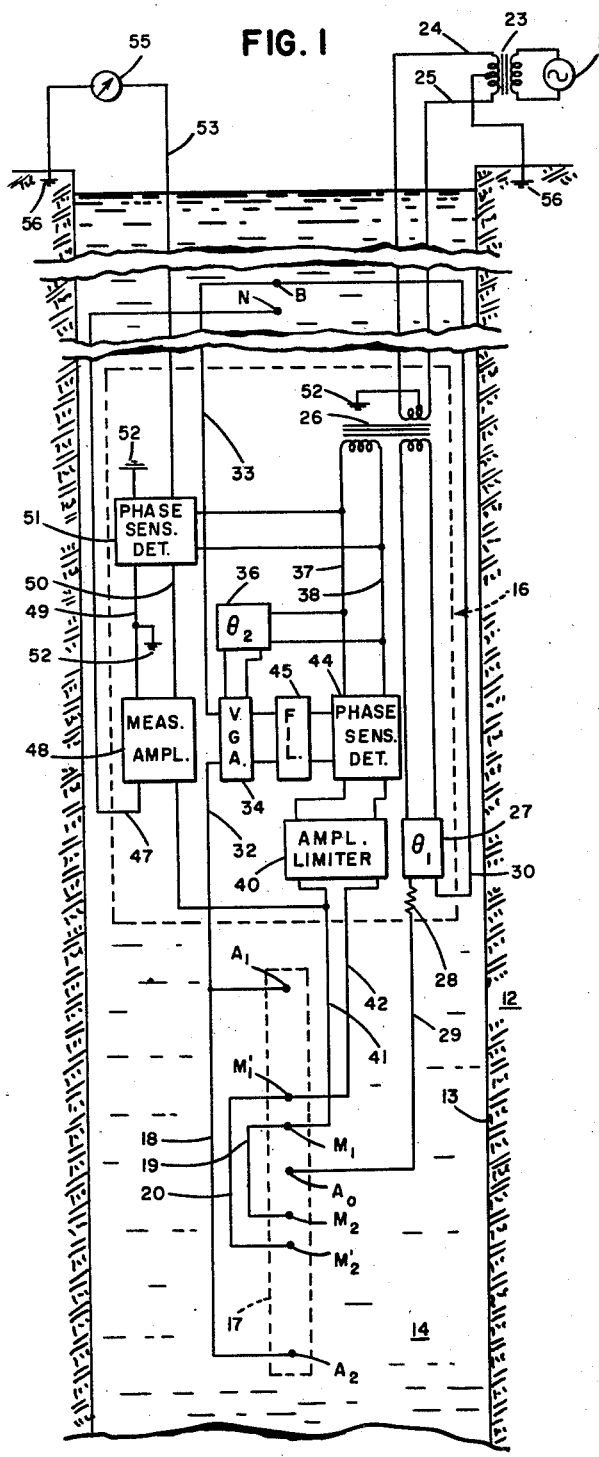
Fig. 1 is a schematic diagram of an electrical well logging system constructed according to the invention.
Fig. 2 is a graphical representation of the gain control characteristics of the variable gain amplifier employed in the system of Fig. 1.
Fig. 5 is a schematic diagram of an electrode array which may be used in lieu of the electrode array illustrated in Fig. 1.

In Fig. 1, a well logging system in accordance with the invention is shown for deriving indications of the resistivity of earth formations 12 traversed by a borehole 13 containing a conductive weighting fluid 14 such as a suitable drilling mud. To obtain signals at the earth's surface characteristic of the earth formations traversed, a winch and electric cable (not shown) are employed to move a fluid tight housing 16 and an electrode array 17 longitudinally through the borehole. In the customary manner, the successive depths of the electrode array 17 may be correlated with resistivity indications at the earth's surface by depth measurements dependent upon the length of cable traversing a fixed point at the earth's surface. Conveniently, the cable may be of the multiconductor type having a conductive armor insulated from the cable conductors. For a substantial distance above the housing 16, the armor may be insulated from the conductive fluid 14. The housing 16 may similarly be insulated.

The electrode array 17 includes a main electrode $A_0$ and spaced on either side of the main electrode, portions $A_1$ and $A_2$ of an auxiliary electrode mounted in the manner disclosed in the aforementioned Doll Patent No. 2,712,627. Electrode $A_0$ serves to pass survey current into adjacent formations, while auxiliary current is emitted from the upper and lower portions $A_1$ and $A_2$ of the auxiliary electrode to establish a region on either side of the main electrode in which the potential gradient along the borehole at a given or reference phase angle is substantially zero. The magnitude of the auxiliary current is determined in accordance with a potential difference of the given phase produced by the survey and auxiliary currents between a pair of points differently spaced near the main electrode $A_0$. While the pair of points may be located either above or below the main electrode, a symmetrical arrangement is preferred as the pair of points then serve to fix the position of the region of regulated potential gradient both above and below the main electrode $A_0$.

Accordingly, a first pair of measuring electrodes $M_1$, $M_1'$ are spaced close to one another a short distance above electrode $A_0$ and a second pair of measuring electrodes $M_2$, $M_2'$ are correspondingly spaced below the electrode $A_0$. A symmetrical distribution of potentials is achieved by connecting corresponding electrodes above and below main electrode $A_0$ with insulated conductors 18, 19, and 20. Suitable spacings for the various electrodes are more fully discussed in Doll Patent No. 2,712,627. It may be observed, however, that the "spacing" of electrodes $M_1$, $M_1'$ from the main electrode $A_0$ and the "spread" between the main and auxiliary electrode is suitably chosen so that the survey current at the given phase angle passes perpendicularly into the adjacent formations beyond the borehole wall. In cases of permeable formations, the survey current of that phase may pass perpendicularly not only through any mud cake which may be formed on the borehole wall, but also through the zone invaded by mud filtrate and into the more remote zone where connate water is not flushed by the mud filtrate.

To furnish survey current of constant amplitude, an A.C. source 22 is coupled by transformer 23 at the earth's surface with cable conductors 24, 25 connecting with the primary winding of a transformer 26 in the housing 16. Connected to a secondary winding of transformer 26 is a phase shifting circuit 27. A resistor 28 having a value which is much higher than the resistance encountered between main electrode $A_0$ and ground is connected to the output of circuit 27 so as to regulate the survey current. By means of conductors 29, 30, this source of constant survey current provided by phase shifting circuit 27 is connected to electrodes $A_0$ and B, respectively. To serve as a remote current return point, the electrode B may be an exposed portion of the cable armor located a distance, for example, of 75 feet above housing 16. Taking the potential induced in the secondary windings of transformer 26 as at a reference phase angle of zero degrees, phase shifting circuit 27 may be of any conventional design adapted to shift the phase of the survey current through an angle $\theta_1$ with respect to the reference phase where $\theta_1$ is, for example, 45°.

The auxiliary current emitted from the auxiliary electrode is carried by conductors 32, 33 connecting the auxiliary electrode $A_1$, $A_2$ and the remote electrode B, respectively, with the output of variable gain amplifier 34. As the design details of suitable variable gain amplifiers are well known, it will suffice to observe that one stage of the variable gain amplifier may, for example, comprise a multigrid vacuum tube having a constant excitation signal applied to one grid and a biased gain control signal applied to another grid. Exemplary gain control characteristics are represented in Fig. 2 by curve 35 plotted against a linear scale representing variations of the gain control signal $e_c$ about the bias potential and a logarithmic scale representing the overall gain $G_1$ of the variable gain amplifier 34. It may be observed that curve 35 is substantially linear for variations of the gain control signal between plus or minus 3.5 volts D.C. and that the ratio N of the maximum gain to the minimum gain is, in this illustration, 1,000. Thus, the gain is seen to vary exponentially with changes in the gain control signal $e_c$. This exponential relationship may be attributed to characteristics of vacuum tubes suitable for variable gain stages, such characteristics being illustrated in volume 18 of the M.I.T. Radiation Laboratory Series, entitled, "Vacuum Tube Amplifiers" by Valley, et al., at pages 415–416. While it is not necessary for the purposes of the present invention that an exact exponential relationship be had, a suitable selection among commercially available vacuum tubes, such as the type 6J6, will yield the desired characteristics.

Figure 3:
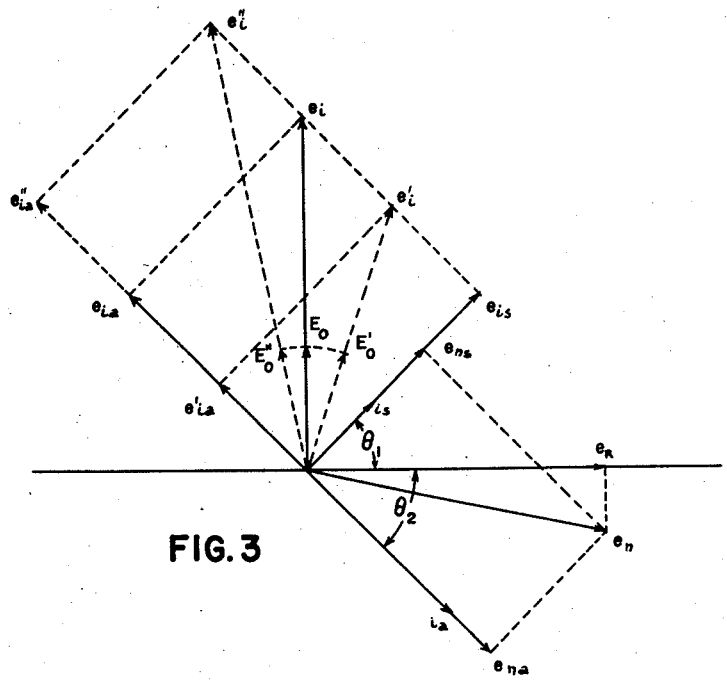
Fig. 3 is a vector diagram to facilitate an understanding of the operation of this system.

To excite or energize the variable gain amplifier 34 at a given phase angle $\theta_2$, a phase shifting circuit 36 is connected by conductors 37, 38 between a secondary winding of transformer 26 and the input of the variable gain amplifier. The phase relationships shown diagrammatically in Fig. 3 are obtained when the value of the phase angle $\theta_2$ is a minus 45°, whereby the emitted auxiliary current lags the survey current by 90°. Desirably, the variable gain amplifier 34 is by design relatively free of phase shift, a tolerance of plus or minus 2°, for example, being acceptable for practical requirements of accuracy.

While the phase relationship between the survey and auxiliary currents is thus determined by phase shifting circuits 27 and 36, the amplitude of the auxiliary current is governed by a feedback control loop including the variable gain amplifier 34 and circuitry for controlling its gain. Such circuitry comprises an amplifier-limiter 40 having its input coupled by conductors 41, 42 to measuring electrodes $M_1$, $M_1'$ and its output coupled to a phase sensitive detector 44. The output of phase sensitive detector 44 is, in turn, coupled through a filter 45 to the gain controlling input circuit of the variable gain amplifier 34. The feedback loop thus formed is characterized by a loop gain $G_L$ and by degenerative operation tending to maintain the potential difference $e_1$ of given phase produced between measuring electrodes $M_1$, $M_1'$ at a fixed value such as substantially zero.

To obtain a stable and effective control of this potential difference, the amplified version $e_0$ of the potential difference $e_1$ between electrodes $M_1$, $M_1'$ is limited so as not to exceed a fixed signal level $E_0$ at the input of the phase sensitive detector 44. Amplifier-limiter 40 may thus have a conventional form comprising plural stages of amplification affording a gain, for example, of one-million followed by a stage of amplification which reaches saturation as its output approaches $E_0$. Such saturation may be secured by operating the last amplification stage with a low grid bias and plate supply potential. Other suitable means for limiting excursions of the gain control signal may, of course, be employed.

Phase sensitive detector 44 is conveniently of the biased type supplying a bias potential $E_c$ to the variable gain amplifier 34 for setting the gain for zero value of the gain control signal $e_c$. Alternatively, the bias potential may be supplied in the variable gain amplifier itself. Design details of suitable phase sensitive detectors are to be found in volume 25 of the M.I.T. Radiation Laboratory Series entitled, "Theory of Servo-Mechanisms" by James, et al, at page 111–114 (published by McGraw-Hill Book Company, New York), in volume 19 of this series entitled, "Wave Forms" by Chance, et al., at pages 511–513, or in volume 22 of the "Review of Scientific Instruments" for April, 1951, in an article by N. A. Schuster at pages 254–255. Other suitable designs may, of course, be employed. While the operation of phase sensitive detectors is well known, it may be observed that phase sensitive detector 44 is polarized to develop a D.C. gain control $e_c$ proportional to the component of signal $e_o$ derived from amplifier-limiter 40 which is at the zero phase angle of a reference signal supplied to the detector 44 via conductors 37, 38. A negative gain control signal $e_c$ is obtained when the component in phase with the reference signal is negative.

Filter 45 may be of a conventional design affording a relatively long time constant to attenuate high frequencies and to set a maximum limit on the rate of excursion of the gain control signal $e_c$. The time constant must be sufficiently short that the gain may be adjusted at the rate required for normal variations in formation conditions. In present practice, the upper frequency of logging signal variations is about 15 cycles per second, so that a time constant for the filter 45 shorter than, say, 0.05 second is suitable. Accordingly, when a sudden change in borehole conditions creates a larger error signal or potential difference between electrodes $M_1$, $M_1'$, the output of amplifier-limiter 40 rises immediately to its maximum value $E_0$ and the output of the detector 44 correspondingly rises to represent the component of the signal $E_0$ in phase with the reference signal from transformer 26. The gain control signal $e_c$ applied to the variable gain amplifier by the filter 45, however, does not rise instantaneously, but at a rate governed by the time constant of the filter 45. To insure that the gain is brought to the required value at substantially the maximum rate permitted by the filter time constant, the limiter output signal $E_0$ is substantially larger than the signal $e_c$ required to effect the necessary adjustment of the gain $G_1$. Thus, $E_0$ may be a given value between 10 and 35 volts, for example, where the maximum gain control signal required is, say, 3.5 volts.

Ordinarily, adjustment of the gain $G_1$ of the variable gain amplifier within the established range serves to diminish the error signal by altering that component of the error signal which is produced by flow of the auxiliary current. Under some conditions, a tendency toward hunting may arise whereby rapid correction of the auxiliary current tends to produce a large error of opposite sense. However, in a manner to be explained hereinafter, the phase sensitivity of the gain control circuit precludes such hunting.

With a perpendicular flow of survey current at the reference phase angle into the formations adjacent the main electrode $A_0$, the potential drop measured at the reference phase angle along the path of the current between the wall of the borehole and a remote ground point accurately reflects the desired measure of formation resistivity. It is a function, in the case of permeable formations, of the resistivity of both the invaded and the uninvaded zones of a formation lying beyond the borehole wall. To derive a signal representing this measure of formation resistivity, a potential difference of given phase produced between one point disposed in the vicinity of the main electrode and a remote reference point is detected. Such one point is preferably located in the region of controlled potential gradient on either side of the main electrode.

Accordingly the potential difference or "normal" signal produced between electrode $M_1$ and a remote reference electrode N is applied via conductors 41 and 47, respectively, to a measure amplifier 48 of conventional design having its output coupled by conductors 49, 50 to a phase sensitive detector 51. It is desirable that electrode N be spaced from current return electrode B so as not to be appreciably influenced by resistivity conditions in the vicinity of the returning current. Accordingly, electrode N may be spaced along the insulated portion of the cable intermediate the housing 16 and the electrode B, in a practical arrangement. Phase sensitive detector 51 may be similar in design to phase sensitive detector 44 and is preferably energized by a reference signal at the same zero phase angle, such as a signal derived from conductors 37, 38. The output of detector 51 with respect to ground at 52 is supplied via cable conductor 53 to one terminal of indicating device 55. To complete the measuring circuit, device 55 is grounded at point 56 as is the mid-tap for the secondary winding of transformer 23. By grounding mid-tap of the primary winding for transformer 26 at point 52 within the housing 16, a phantom ground return is provided through the power supply conductors 24, 25. Conveniently, indicating device 55 is of the conventional type employed in well logging such as, for example, a multiple unit, galvanometric type of recorder arranged to provide galvanometics of the measuring signal variations as a function of depth of the electrode array 17.

In operation, survey current is passed from the main electrode $A_0$ into adjacent formations with a phase angle $\theta_1$, such as 45°, and is returned at the remote electrode B. Flow of the survey current produces an electric field of potential distributions including a potential difference $e_{is}$ across measuring electrodes $M_1$, $M_1'$ at the phase angle $\theta_1$. This component of potential difference $e_{is}$ may be referred to as the "inverse" signal due to the survey current. Since the survey current $i_s$ is regulated at substantially constant value by the presence of resistor 28, variations in the inverse signal $e_{is}$ are attributable to changes in the borehole conditions which may occur, for example, as the main electrode is moved past thin conductive streaks embedded between thick, highly resistive formations.

Assuming that the gain control signal $e_c$ is initially zero, the amplitude of the auxiliary current $i_a$ supplied by the variable gain amplifier 34 at phase angle $\theta_2$ is determined in accordance with gain $G_1$ of amplifier 34 corresponding to the gain control bias potential $E_c$. Flow of auxiliary current from the portions $A_1$, $A_2$ of the auxiliary electrode also produces an inverse signal across measuring electrodes $M_1$, $M_1'$, which is designated $e_{ia}$. The inverse signal $e_{ia}$ is taken to be of opposite phase from the auxiliary current $i_a$, because the dominant portion of the auxiliary current is emitted more proximate to the outer measuring electrodes $M_1'$, $M_2'$ than to the inner electrodes $M_1$, $M_2$, contrary to the relationships exiting for the survey current. Reference is made to the vector diagram of Fig. 3 for an exemplary representation of the phase and amplitude relationships at a given instant of time.

In the vector diagram, the resultant $e_i$ of the inverse signals $e_{is}$ and $e_{ia}$ due, respectively, to the survey and auxiliary currents extends at the phase angle of 90° or in quadrature with the phase angle of 0° at which phase sensitive detector 44 is polarized. Since the vector representing the inverse signal $e_i$ has no component with a zero or reference phase angle, the gain control signal applied to the variable gain amplifier is $E_c$, indicating balance of the survey and auxiliary currents and a zero potential difference at zero phase angle between measuring electrodes $M_1$ and $M_1'$. Opposite another formation or under other borehole conditions, the auxiliary current $i_a$ might produce an insufficient inverse signal $e_{ia}'$. As indicated in Fig. 3, the resultant $e_i'$ of inverse signals $e_{ia}'$ and $e_{is}$ has a positive component of zero phase. The detector 44 would, accordingly, supply a positive gain control signal $e_c$ to the variable gain amplifier to raise its gain $G_1$ and increase the auxiliary current $i_a$. Assuming that the resultant inverse signal $e_i'$ is sufficiently large that, when amplified, it would equal the limiting value $E_0'$, the gain control signal $e_c$ would be correspondingly limited to the component of $E_0'$ at the zero phase angle. If, on the other hand, auxiliary current resulted in an excessive inverse signal $e_{ia}''$, an amplified version of the resulting inverse signal $e_i''$, not exceeding $E_0''$, would be detected having a negative component of zero phase angle. The gain control signal $e_c$ would then have a negative value corresponding to this component.

It may be observed that the out-of-phase relationship between the survey and auxiliary currents enables the phase sensitive detector 44 to supply the gain control circuit of the variable gain amplifier 34 with a signal varying in amplitude and polarity in accordance with the balance of the inverse signal components $e_{is}$ and $e_{ia}$ despite limiting action which may fix the output value of the amplifier-limiter 40. This feature allows a rapid and accurate adjustment of the auxiliary current without hunting, following a momentary disturbance which creates a large error or unbalance between the inverse signal components $e_{is}$ and $e_{ia}$. Balance of the signal components is useful, it will be appreciated, in the derivation of measure signals having the same characteristic significance as measure signals obtained in accordance with aforementioned H. G. Doll Patent No. 2,712,627. That is to say, at a given phase angle at which the gain control circuit and the measuring circuit are polarized, the emission of auxiliary current effectively controls the distribution of survey current to establish regions of zero potential gradient extending transversely of the borehole on either side of the main electrode $A_0$. Thus, logs of formation resistivity may be produced by the indicating device 55 which have the desired significance, without requiring an exacting design of the control loop for circuit stability under abruptly changing formation conditions.

Considering the stabilizing effect of the limiter in somewhat greater detail, the loop gain $G_L$ may be determined by assuming that the feedback loop is broken between filter 45 and variable gain amplifier 34 and that the gain control signal $e_c$ is increased by an increment $\delta e_c$ applied to the gain control stage. Traversing the feedback loop to ascertain the incremental change in the output $\delta e_c'$ from the filter, the change in gain for the variable gain amplifier is given by the expression:

(1) $$\delta G_1 = G_1' \delta e_c$$

where $$G_1' = \frac{\partial G_1}{\partial e_c}$$

Otherwise expressed, the gain control signal $e_c$ effects a percentage change in gain $G_1$ of the variable gain amplifier. The incremental change in the resulting inverse signal $e_i$ is:

(2) $$\delta e_{ia} = e_{ia} \frac{\delta G_1}{G_1}$$

Assuming the residual error signal $e_i$ was originally 45° out of phase with $e_{is}$ and $e_{ia}$, the incremental change $\delta\phi$ in this phase angle is given by:

(3) $$\delta\phi = 1/2 \frac{\delta e_{ia}}{e_{ia}}$$

For small angles of phase departure, measured in radians, the phase sensitive detector may be characterized by a linear relationship:

(4) $$\delta e_c' = k_1 e_0 \delta\phi$$

where $k_1$ represents attenuation in the filter 45 and $e_0$ is the output signal of amplifier-limiter 40. As the loop gain $G_L$ is by definition the ratio of an incremental output signal $\delta e_c'$ to an incremental input signal $e_c$ at an arbitrarily selected point in the loop, loop gain is given by the following expression:

(5) $$G_L = 1/2 k_1 e_0 \left(\frac{G_1'}{G_1}\right)$$

Since $e_0$ is maintained at the constant value $E_0$ by the amplifier limiter 40, the loop gain varies only with the ratio $G_1'/G_1$. This ratio, however, remains approximately constant due to the exponential gain control characteristics of the variable gain amplifier 34.

If the resultant inverse signal $e_i$ is insufficient to produce limiting action, $e_0$ may have a value less than the limiting value $E_0$ in which case the loop gain $G_L$ may be diminished. However, under such circumstances, a reduced loop gain is desirable. Therefore, the result is achieved that the maximum required gain may be derived from the variable gain amplifier when needed, without risk of excessive loop gain. By avoiding excessive loop gain, less critical circuit components may be employed without risk of instability. For example, critical tuning of coupling circuits may be avoided and very stable electronic components need not be used.

A further advantage flowing from the use of out-of-phase currents is the increase in the inverse signal which is utilized to control the auxiliary current. In conventional systems, the inverse signals, which are measured in microvolts, result in a relatively low signal-to-noise ratio and consequently higher design requirements. In contrast, the gain control circuit of the present invention is supplied with a relatively large inverse signal, is relatively non-critical to the amplitude of this signal, and requires only a practicable degree of phase accuracy for obtaining the desired balance between the inverse signal components $e_{is}$ and $e_{ia}$. Additionally, by utilizing a frequency for the source 22 of, for example, four hundred cycles, the risk of carrier frequency oscillations is removed by the presence of the filter 45 and by the effective break in the carrier frequency loop accomplished by conversion of the A.C. error signal to a D.C. gain control signal.

The phase angles $\theta_1$ and $\theta_2$ for the embodiment of Fig. 1 are not restricted to any partciular values, such as plus or minus 45°, so long as the total included angle $\theta$ between the phases of the survey and auxiliary currents is less than 180°. Referring first to Fig. 3, vectors representing the so-called "normal" signal components $e_{ns}$ and $e_{na}$ are shown to have the phase angles $\theta_1$ and $\theta_2$ of plus and minus 45°, respectively. The resultant normal signal $e_n$ is seen to be displaced in phase from the reference phase. Since the phase sensitive detector 51 is sensitized by a signal at the reference phase, only the in-phase component $e_R$ of the resultant normal signal $e_n$ is furnished to the indicating device 55 as a measure of formation resistivity. It may be noted that the measuring signal $e_R$ supplied by the phase sensitive detector 51 is a D.C. signal to which the indicating device 55 is sensitive and that any A.C. potentials induced in the cable conductor 53 by proximity to the power conductors 24, 25 do not affect the indications derived.

Figure 4:
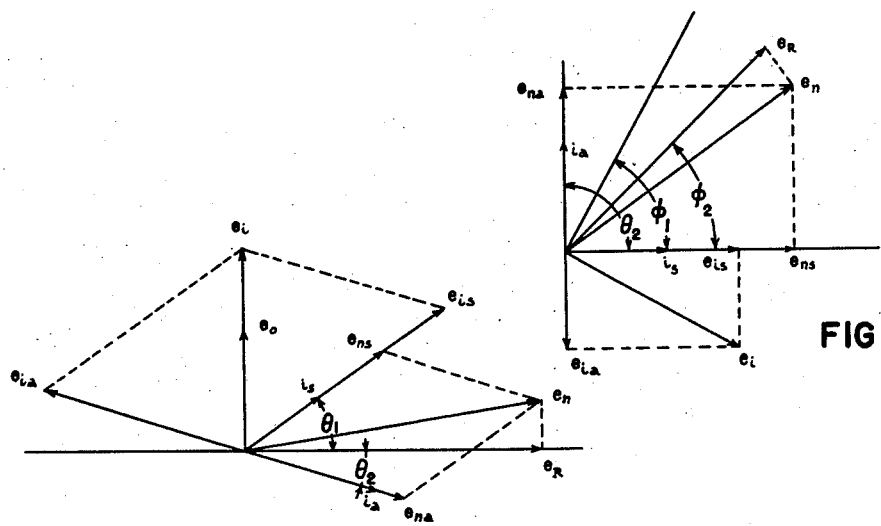
Fig. 4 is a vector diagram illustrating the phase relationships which may exist between various signals of the system.

Considering now the phase relationships represented in Fig. 4, angles $\theta_1$ and $\theta_2$ are different and are less than 45°. Under the same borehole conditions and with the same amplitude of survey current $i_s$, the normal and inverse signal components $e_{ns}$ and $e_{is}$ due to the survey current will have the same amplitude as in Fig. 3. Since the resultant inverse signal $e_i$ must be in phase quadrature with the reference phase as a result of degenerative feedback via the gain control circuit, the required amplitude of the inverse signal component $e_{ia}$ and accordingly of the auxiliary current $i_a$ is determined. The normal signal component $e_{na}$ varies with the auxiliary current $i_a$. When added with the normal signal component $e_{ns}$, the resultant normal signal $e_n$ has the same component $e_R$ at the reference phase as occurred when the phase angles $\theta_1$ and $\theta_2$ were plus and minus 45°. In other words, the same characteristic indications of formation resistivity may be secured despite wide variations in the phase angles of the survey and auxiliary currents.

Resistivity indications of different significance may be secured, however, by polarizing the phase sensitive detectors 44 and 51 at different phase angles. For example, if the phase sensitive detector 51 is polarized at a minus 45° along with the auxiliary current $i_a$, while the survey current is polarized at a plus 45°, distinctive resistivity indications are obtained of the type described in copending application Serial No. 571,271 filed March 13, 1956 by F. Segesman for "Well Logging Systems." Thus, if the measuring circuit is polarized at the phase angle $\theta_2$ in phase quadrature with respect to the normal signal component $e_{ns}$, this component makes no contribution to the measure signal $e_R$. As the inverse signals are balanced at the zero phase angle, the resistivity indications obtained are determined solely by the potential difference produced by the auxiliary current between the measuring electrode and the remote reference electrode.

It will be understood that the survey current is maintained constant in order that measure signal $e_R$ will be proportional to the formation resistivity. However, where the survey current is allowed to vary, formation resistivity may be determined by dividing the measure signal $e_R$ by the survey current $i_s$ utilizing, for example, a conventional ratiometer. On the other hand, the survey current may be subjected to deliberate variations for obtaining a compressed scale of resistivity indications in the manner taught in copending application Serial No. 419,762 filed March 30, 1954 by F. Kokesh for "Electrical Well Logging" now Patent No. 2,776,402, granted January 1, 1957. Thus, a resistor may be connected between the main electrode $A_0$ and the current return electrode B of a value serving to divert survey current from flowing into the adjacent formations as the potential of the main electrode $A_0$ increases.

In lieu of electrode array 17 of Fig. 1, other suitable electrode arrays may be employed in accordance with the present invention, including, for example, the electrode array 17' of Fig. 5. In accordance with the teachings of aforementioned Doll Patent 2,712,628, the electrode array 17' comprises a main electrode $A_0$ of cylindrical form, and, spaced a short distance above and below the main electrode, upper and lower portions $A_1$, $A_2$ of an auxiliary electrode. The portions $A_1$, $A_2$ are elongated and of cylindrical form having substantially the same diameter as main electrode $A_0$. The potential difference supplied to amplifier-limiter 40 via conductors 41, 42 is that existing between the adjacent edges of electrodes $A_0$ and $A_1$. Furthermore, the potential difference which represents formation resistivity is detected between the main electrode $A_0$ and remote reference electrode N. Otherwise, the circuitry and operation are as shown and described in connection with Fig. 1.

In Fig. 6 there is shown a well logging system arranged in accordance with the present invention to derive simultaneous resistivity indications of different character utilizing an eelctrode array of the type disclosed in Doll Patent No. 2,712,629. In this embodiment, a cushion member 60 composed, for example, of rubber is supported by a bowed spring 61 (shown in fragmentary form) from an elongated carrier (not shown) secured dependently below housing 16. Conveniently, the carrier is uninsulated so as to serve as a remote current return electrode or ground 62.

Cushion member 60 may have a generally oval outer face 64 of cylindrical contour for conforming to and sealing with a relatively limited portion of the borehole wall. Inlaid in the outer face 64 is a central main electrode $A_0$ and spaced outwardly therefrom at successive distances, measuring electrodes $M_1$ and $M_2$ and auxiliary current electrode $A_1$. The electrodes suitably are of circular configuration concentric with the main electrode $A_0$ and recessed slightly from the face 64. As seen in cross section, portions of electrodes $M_1$, $M_2$ and $A_1$ are aligned longitudinally of the borehole on either side of main electrode $A_0$. However, the measuring electrodes $M_1$, $M_2$ may, if desired, consist only of portions spaced different distances horizontally or laterally from the main electrode $A_0$. Further, the electrodes may have a confocal elliptical configuration, as is disclosed in Patent No. 2,750,557 issued June 12, 1956 to J. Bricaud for "Electrical Logging of Subterranean Formations."

Figure 7:
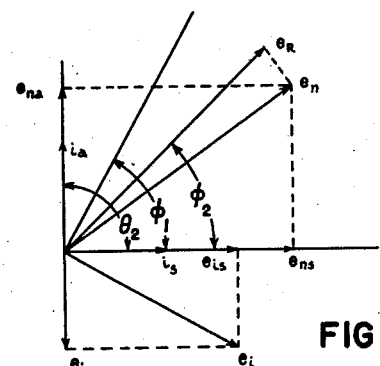
Fig. 7 is a vector diagram illustrating the phase relationships of signals in the system of Fig. 6.

To pass current between the main electrode $A_0$ and current return point 62 through the adjacent formations, an oscillator 65 in housing 16 is supplied with power from source 22 and has its output coupled by conductors 66, 67 to the main electrode and to the current return point 62. Oscillator 65 may be of any suitable type and is preferably regulated to supply a constant survey current of given phase. Auxiliary current is again derived from variable gain amplifier 34, conductors 32 and 33 serving to connect its output to the auxiliary electrode $A_1$ and current return point 62, respectively. It will be appreciated that the electric field established about the electrodes carried by cushion member 60 is considerably more confined than that established by electrode array 17 of Fig. 1. Accordingly, current return point 62 may be spaced behind the cushion member 60 coincident with the elongated carrier for the cushion member and yet be remote in its electrical effect upon the current and potential distribution established by the electrodes. The phase $\theta_2$ at which the variable gain amplifier is excited relative to the reference phase of the survey current is advanced by phase shifting circuit 69. For ease in deriving simultaneous different indications of resistivity, the phase angle $\theta_2$ is preferably 90°, as shown in Fig. 7.

The resultant $e_i$ of the inverse signals $e_{is}$ and $e_{ia}$ is manifested as a potential difference between measuring electrodes $M_1$ and $M_2$ and is applied via conductors 41, 42 to the input of amplifier 70. Like amplifier-limiter 40 of Fig. 1, amplifier 70 preferably has a high gain and is substantially free of phase shift. The amplified version of the inverse signal $e_i$ derived from amplifier 70 is coupled through limiter 71 to the phase sensitive detector 44. Amplifier 70 and limiter 71 may, of course, be combined as in amplifier-limiter 40 of Fig. 1. Phase sensitive detector 44 is polarized at the phase angle $\phi_1$ by connection of its reference input circuit through phase shifting circuit 73 to the output of oscillator 65. The phase angle $\phi_1$ may, for example, be 60° as shown in the vector diagram of Fig. 7. Filter 45 is again interposed between phase sensitive detector 44 and the gain control circuit of variable gain amplifier 34.

The measuring circuit includes a first channel which is the same as the measuring circuit of Fig. 1, except that phase sensitive detector 51 is polarized at a phase angle $\phi_2$ by connection of its reference input circuit through a phase shifting circuit 75 to the output of oscillator 65. A second channel of the measuring circuit is provided for deriving indications of resistivity of the type characteristic of systems according to H. G. Doll Patent No. 2,669,690 issued February 16, 1954. This second channel includes a phase sensitive detector 77 coupled to the output of amplifier 70 and supplying a rectified output with reference to ground point 52 via cable conductor 78 to an indicating device 79 grounded at point 56. Indicating device 79 may, if desired, be simply a second unit of a galvanometric type recorder which includes device 55 as a first unit. To render detector 77 selectively responsive to the component of inverse signal $e_{is}$ in phase with the survey current, conductors 80, 81 connect the reference input circuit of phase sensitive detector 77 directly to the output of oscillator 65 for polarization in phase with the survey current.

In operation, the cushion member 60 is moved longitudinally through the borehole with housing 16 while resiliently urged by bowed springs 61 against the borehole wall. Direct contact between the electrodes and the column of fluid 14 is thereby avoided. Survey current from oscillator 65 is passed at a constant rate from main electrode $A_0$ into the adjacent formations. The magnitude of auxiliary current $i_a$ emitted from electrode $A_1$ at phase angle $\theta_2$ is determined by the feedback action of the gain control loop such that the resultant inverse signal $e_1$ has no component of phase angle $\phi_1$ at which phase sensitive detector 44 is polarized. That is, the magnitude of auxiliary current $i_a$ is automatically adjusted so that the adjusted value of the inverse signal $e_{ia}$ due to the auxiliary current when combined with the inverse signal $e_{is}$ produces a resultant inverse signal $e_1$ in phase quadrature with the reference signal supplied to the detector 44. Assuming a phase angle $\phi_1$ of 60° for this reference signal, as an example, the resultant inverse signal $e_1$ lags the reference phase of the survey current by 30°.

Because phase sensitive detector 51 is polarized at the phase angle $\phi_2$, indicating device 55 responds only to that component of the resultant normal signal $e_n$ which has the phase angle $\phi_2$. To obtain resistivity indications in accordance with the teachings of H. G. Doll Patent No. 2,712,629, phase angles $\phi_1$ and $\phi_2$ should be equal. Inequality of the phase angles results in resistivity indications representing an unequal weighting of the normal signals $e_{ns}$ and $e_{na}$ produced by the survey and auxiliary currents.

At the same time that resistivity indications are obtained by device 55 corresponding to the measure signal $e_R$, indicating device 79 provides resistivity indications proportional to the potential difference produced by the survey current between the measuring electrodes $M_1$, $M_2$. Simultaneous recording of these distinctive resistivity indications as a function of depth of the cushion member 60 affords ready means for delineating permeable formations, as taught in H. G. Doll Patent No. 2,712,629.

The system of Fig. 8 is similar to that of Fig. 1 but embodies the principles of the invention in somewhat simpler form. Whereas in Fig. 1 phase shifting circuits 27 and 36 are utilized to shift the phase of the survey and auxiliary currents, respectively, with respect to the output signal at transformer 26, in Fig. 8, resistor 28 is connected in series with the main electrode $A_0$ and is shunted by a capacitor 83. Remote electrode B is connected by conductor 30 directly to secondary winding of transformer 26 to serve as a remote current return point. The excitation circuit for the variable gain amplifier 34 is also modified. In lieu of phase shifting circuit 36, a direct connection via conductors 37, 38 is made between the input of the variable gain amplifier 34 and the secondary winding of transformer 26. In other respects, the system of Fig. 8 may be identical with the system of Fig. 1.

The vector diagram of Fig. 9 illustrates exemplary phase relationships obtained in the operation of the system of Fig. 8. Due to the capacitive reactance of the shunt capacitor 83, the survey current $i_s$ has a leading quadrature component, and a resultant phase angle of $\theta_1$. Desirably, $\theta_1$ is made a relatively small angle by suitable selection of the values of resistor 28 and capacitor 83. Since the phase sensitive detector 44 in the feedback loop is polarized at the reference phase angle, the gain of the variable gain amplifier 34 is automatically adjusted to set the resultant $e_1$ of the inverse signals $e_{is}$ and $e_{ia}$ in phase quadrature with the reference phase. It may be noted that even when the inverse signals $e_{is}$ and $e_{ia}$ are nearly equal in magnitude, an appreciable resultant inverse signal $e_1$ is obtained, thereby improving the signal-to-noise ratio. The measuring circuit includes phase sensitive detector 51 similarly polarized at the reference phase angle. Accordingly, the full normal signal $e_{na}$ produced by the auxiliary current is added to the component of normal signal $e_{ns}$ produced by the portion of survey current at the reference phase angle to obtain a measure signal $e_R$ representing formation resistivity.

It may be noted that the normal signal $e_{na}$ due to the auxiliary current is usually substantially larger than the normal signal $e_{ns}$ due to the survey current. By polarizing the measure circuit at the phase angle of the auxiliary current, the measuring circuit is relatively insensitive to slight deviations in the predominant normal signal $e_{na}$ from this phase and is thereby enhanced in phase stability. Because the measuring circuit is polarized at the reference phase angle, it may be observed that the quadrature component of the survey current contributes nothing to the measure signal. The purpose of adding the quadrature component of survey current is, then, to permit use of the amplifier-limiter 40 for loop gain stability and yet provide the variable gain amplifier 34 with a control signal representing the unbalance between the inverse signals $e_{is}$ and $e_{ia}$. Thus, even though amplifier-limiter 40 provides an output limited at the value $E_0$, the gain of the variable gain amplifier may be controlled in accordance with changes in the phase of the signal $E_0$. In other respects, the operation and characteristics of the system shown in Fig. 8 are similar to those of the system in Fig. 1.

The advantages in loop gain stability obtained with limiting of the resultant inverse signal may be secured, in accordance with the principles of the invention, although the survey and auxiliary currents are emitted in phase with one another. Referring to Fig. 10, which shows the modified portions of the circuitry, conductor 29 is seen to afford direct connection of main electrode $A_0$ to the source of survey current. Accordingly, survey current is emitted at the reference phase angle. The system of Fig. 10 is otherwise arranged identically with that of Fig. 8.

Under favorable borehole conditions, the resultant inverse signal $e_1$ is the algebraic difference of the signals $e_{is}$ and $e_{ia}$, amplified output $e_0$ of amplifier-limiter 40 being less than the maximum limiting value $E_0$. A rectified version $e_c$ of this amplified output signal $e_0$ serves to control the gain of the variable gain amplifier 34 in a sense tending to reduce the magnitude of the resultant inverse signal $e_1$. When a sudden change in borehole conditions occurs as the electrode array is moved through the borehole, however, the resultant inverse signal $e_1$ may increase to a large value before the auxiliary current is sufficiently corrected. If the limiting action were not present, the feedback loop gain might be increased a hundred or more times corresponding to an increased gain of the variable gain amplifier and result in instability and oscillation of the feedback loop. Alternatively, increases in the resistivity of the borehole fluid 14 may cause hunting in the feedback loop with excursions of the resultant inverse signal $e_1$ sufficient to entail limiting action. In accordance with the principles of the invention, the limiter operating in conjunction with the filter 45 serves to stabilize the otherwise instable oscillations or hunting. To achieve such stabilization, the limiter serves to restrict the amplitude of hunting, while the filter serves to reduce the rate of such hunting.

Analytically, the operation may be understood from the following relationship, the gain in the phase sensitive detector 44 being assumed at unity, (6) $$\frac{de_c}{dt} = \frac{\pm E_0 - E_c}{T_f}$$

where $E_c$ is the bias signal derived from the phase sensitive detector 44 and $T_f$ is the relatively long time constant of filter 45. Since the limiting value $\pm E_0$ is larger than the maximum value of $e_c$ required for varying the gain of variable gain amplifier in the necessary range, as by a factor 10, for example, the gain control signal $e_c$ may vary continuously at the constant rate established by the filter until the system is free of the disturbing condition. However, the excursions of the resultant inverse signal $e_i$ always remain smaller than the limiting value $E_0$ divided by the gain of the amplifier-limiter 40. Thus, by suitably selecting the value of gain and of the maximum output signal $E_0$ for amplifier-limiter 40, balance of the inverse signals $e_{is}$ and $e_{ia}$ may be maintained within tolerable limits of accuracy. For example, if $E_0$ is 10 volts and the gain of amplifier-limiter 40 is one million, the resultant inverse signal will not exceed 10 microvolts. In this analysis, phase shifts which are tolerable in any practical version of the well logging system are ignored. It may be observed that the presence of tolerable phase shifts renders the operation of the embodiment shown in Fig. 10 substantially identical with that of Fig. 8. To the extent that inherent phase shifts are present in the system of Fig. 10, as are deliberately introduced in the system shown in Fig. 8, hunting of the system of Fig. 10 will be damped.

While the advantages of the invention in stability of operation and higher signal-to-noise ratio may be secured with the above-described embodiments, various modifications in the circuitry and in the electrode arrays may be made, in addition to those disclosed in the aforementioned H. G. Doll and J. M. Bricaud patents and the F. Kokesh application. Accordingly, the invention is not limited to the foregoing embodiments which have been illustrated and described, but is defined in the appended claims.

I claim:

1. In apparatus for investigating earth formations traversed by a borehole, the combination comprising a main electrode mounted for movement longitudinally of a borehole, electric source means coupled to said main electrode and to a current return point for passing survey current into formations adjacent said main electrode, an auxiliary electrode positioned adjacent said main electrode, a variable gain amplifier having its output coupled to said auxiliary electrode and to a current return point, means for energizing said amplifier to emit auxiliary current from said auxiliary electrode, degenerative feedback means responsive to a potential difference of a single given phase produced by said currents between a pair of points differently spaced near said main electrode for deriving a signal degeneratively to control the gain of said amplifier, means for limiting variations in said amplifier gain to stabilize the regulation of said potential difference, and means responsive to a potential difference of given phase produced between a point in the vicinity of said main electrode and a reference point for deriving a signal representing an electrical property of the formations.

2. In apparatus for investigating earth formations traversed by a borehole, the combination comprising a main electrode mounted for movement longitudinally of a borehole, electric source means coupled to said main electrode and to a relatively remote current return point for passing survey current into formations adjacent said main electrode, an auxiliary electrode positioned adjacent said main electrode, a variable gain amplifier having its output coupled to said auxiliary electrode and to a relatively remote current return point, means for energizing said amplifier to emit auxiliary current from said auxiliary electrode, degenerative feedback means responsive to a potential difference of a single given phase produced by said currents between a pair of points spaced intermediate said main and auxiliary electrodes for deriving a control signal degeneratively to control the gain of said amplifier, means for limiting said control signal to correspondingly limit variations in said amplifier gain thereby to stabilize the regulation of said potential difference, and means responsive to a potential difference of given phase produced between a point in the vicinity of said pair of points and a remote reference point for deriving a signal representing formation resistivity.

3. In apparatus for investigating earth formations traversed by a borehole, the combination comprising a main electrode mounted for movement longitudinally of a borehole, electric source means coupled to said main electrode and to a current return point for passing survey current into formations adjacent said main electrode, an auxiliary electrode positioned adjacent said main electrode, a variable gain amplifier having its output coupled to said auxiliary electrode and to a current return point, means for energizing said amplifier to emit auxiliary current from said auxiliary electrode, degenerative feedback means responsive to a potential difference of a single given phase produced by said currents between a pair of points spaced intermediate said main and auxiliary electrodes for deriving a control signal degeneratively to control the gain of said amplifier, said amplifier having a gain which varies substantially as an exponential function of said gain control signal, means for limiting said gain control signal to correspondingly limit variations in said ampifier gain, thereby to stabilize the regulation of said potential difference, and means responsive to a potential difference of given phase produced between a point in the vicinity of said main electrode and a reference point for deriving a signal representing formation resistivity.

4. In apparatus for investigating earth formations traversed by a borehole, the combination comprising a main electrode mounted for movement longitudinally of a borehole, electric source means coupled to said main electrode and to a current return point for passing survey current into formations adjacent said main electrode, an auxiliary electrode positioned adjacent said main electrode, a variable gain amplifier having its output coupled to said auxiliary electrode and to a current return point, means for energizing said amplifier to emit auxiliary current from said auxiliary electrode, degenerative feedback means responsive to a potential difference of a single given phase produced by said currents between a pair of points spaced intermediate said main and auxiliary electrodes for deriving a control signal degeneratively to control the gain of said amplifier, said amplifier having a gain which varies substantially as an exponential function of said gain control signal, means for limiting said gain control signal to correspondingly limit variations in said amplifier gain, thereby to stabilize the regulation of said potential difference, filter means responsive to said gain control signal for limiting the rate of variations in said amplifier gain, and means responsive to a potential difference of given phase produced between a point in the vicinity of said main electrode and a reference point for deriving a signal representing formation resistivity.

5. In apparatus for investigating earth formations traversed by a bore hole, the combination comprising a main electrode mounted for movement longitudinally of a borehole, electric source means coupled to said main electrode and to a current return point for passing survey current into formations adjacent said main electrode, an auxiliary electrode positioned adjacent said main electrode, a variable gain amplifier having its output coupled to said auxiliary electrode and to a current return point, means for energizing said amplifier to emit auxiliary current from said auxiliary electrode, degenerated feedback means responsive to a potential difference of a single given phase produced by said currents between a pair of points spaced intermediate said main and auxiliary electrodes for deriving a control signal degeneratively to control the gain of said amplifier, said variable gain amplifier having a gain which varies substantially as an exponential function of said gain control signal, means for limiting said gain control signal to correspondingly limit variations in said amplifier gain to a fixed range, thereby to stabilize the regulation of said potential difference, said range being in excess of that required to regulate said potential difference at zero value, and means responsive to a potential difference of given phase produced between a point in the vicinity of said main electrode and a reference point for deriving a signal representing formation resistivity.

6. In apparatus for investigating earth formations traversed by a borehole, the combination comprising a main electrode mounted for movement longitudinally of a borehole, electric source means coupled to said main electrode and to a remote current return point for passing survey current into formations adjacent said main electrode, an auxiliary electrode including portions spaced above and below said main electrode, a variable gain amplifier having its output coupled to said auxiliary electrode and to a current return point, means for energizing said amplifier to emit auxiliary current from said auxiliary electrode, a pair of measuring electrodes closely spaced intermediate said main and auxiliary electrodes in longitudinal alignment therewith, degenerative feedback means responsive to a potential difference of a single given phase produced by said currents between said measuring electrodes for deriving a signal degeneratively to control the gain of said amplifier, means for limiting said signal to correspondingly limit variations in said amplifier gain, thereby to stabilize the regulation of said potential difference, and means responsive to a potential difference of a given phase produced between a point in the vicinity of said measuring electrodes and a remote reference point for obtaining indications representing formation resistivity.

7. In apparatus for investigating earth formations traversed by a borehole, the combination comprising a cushion member having a face for sealing with the borehole wall, a main electrode inlaid in said face for movement longitudinally of a borehole, electric source means coupled to said main electrode and to a remote current return point for passing survey current into formations adjacent said main electrode, an auxiliary electrode inlaid in said face surrounding said main electrode and spaced therefrom, a variable gain amplifier having its output coupled to said auxiliary electrode and to a remote current return point, means for energizing said amplifier to emit auxiliary current from said auxiliary electrode, a pair of measuring electrodes spaced intermediate said main and auxiliary electrodes, degenerative feedback means responsive to a potential difference of a single given phase produced by said currents between said measuring electrodes for deriving a signal degeneratively to control the gain of said amplifier, means for limiting said signal to correspondingly limit variations in said amplifier gain, thereby to stabilize the regulation of said potential difference, and means responsive to a potential difference of given phase produced between a point in the vicinity of said main electrode and a remote reference point for obtaining indications representing formation resistivity.

8. In apparatus for investigating earth formations traversed by a borehole, the combination comprising a main electrode mounted for movement longitudinally of a borehole, electric source means coupled to said main electrode and to a remote current return point for passing survey current into formations adjacent said main electrode, an auxiliary electrode including elongated portions spaced from and extending longitudinally above and below said main electrode, a variable gain amplifier having its output coupled to said auxiliary electrode and to a remote current return point, means for energizing said amplifier to emit auxiliary current from said auxiliary electrode, degenerative feedback means responsive to a potential difference of a single given phase produced by said currents between said main and auxiliary electrodes for deriving a signal degeneratively to control the gain of said amplifier, means for limiting said signal to correspondingly limit variations in said amplifier gain, thereby to stabilize the regulation of said potential difference, and means responsive to a potential difference of given phase produced between a point in the vicinity of said main electrode and a remote reference point for obtaining indications representing formation resistivity.

9. In apparatus for investigating earth formations traversed by a borehole, the combination comprising a main electrode mounted for movement longitudinally of a borehole, electric source means coupled to said main electrode and to a current return point for passing survey current into formations adjacent said main electrode, an auxiliary electrode positioned adjacent said main electrode, a variable gain amplifier having its output coupled to said auxiliary electrode and to a current return point, means for energizing said amplifier to emit auxiliary current from said auxiliary electrode out of phase with said survey current, degenerative feedback means responsive to a potential difference of a single given phase produced by said currents between a pair of points spaced intermediate said main and auxiliary electrodes for deriving a signal degeneratively to control the gain of said amplifier, means for limiting said signal to correspondingly limit the variations in said amplifier gain, thereby to stabilize the regulation of said potential difference, and means responsive to a potential difference of given phase produced between a point in the vicinity of said main electrode and a reference point for deriving a signal representing formation resistivity.

10. In apparatus for investigating earth formations traversed by a borehole, the combination comprising a main electrode mounted for movement longitudinally of a borehole, electric source means coupled to said main electrode and to a current return point for passing survey current into formations adjacent said main electrode, an auxiliary electrode positioned adjacent said main electrode, a variable gain amplifier having its output coupled to said auxiliary electrode and to a current return point, means for energizing said amplifier to emit auxiliary current from said auxiliary electrode at a given phase with respect to said survey current, degenerative feedback means responsive to a potential difference of a single different given phase produced by said currents between a pair of points spaced intermediate said main and auxiliary electrodes for deriving a control signal degeneratively to control the gain of said amplifier, said amplifier having a gain which varies substantially as an exponential function of said gain control signal, means for limiting said gain control signal to correspondingly limit variations in said amplifier gain, and means responsive to a potential difference of said given different phase produced between a point in the vicinity of said main electrode and a reference point for deriving a signal representing formation resistivity.

11. In apparatus for investigating earth formations traversed by a borehole, the combination comprising a main electrode mounted for movement longitudinally of a borehole, electric source means coupled to said main electrode and to a remote current return point for passing survey current into formations adjacent said main electrode, an auxiliary electrode including portions spaced above and below said main electrode, a variable gain amplifier having its output coupled to said auxiliary electrode and to a remote current return point, means for energizing said variable gain amplifier to emit auxiliary current from said auxiliary electrode at a given phase angle $\theta$ with respect to said survey current, a pair of measuring electrodes spaced intermediate said main and auxiliary electrodes across which a potential difference is produced by said main and auxiliary currents, degenerative feedback means responsive to a component of said potential difference at a single given phase angle $\phi$ with respect to said survey current for deriving a signal degeneratively to control the gain of said amplifier, said amplifier having a gain which varies substantially as an exponential function of said gain control signal, means for limiting said signal to correspondingly limit variations in said amplifier gain, and means responsive to a potential difference of said phase angle $\phi$ produced between a point in the vicinity of said main electrode and a remote reference point for deriving a signal representing formation resistivity.

12. In apparatus for investigating earth formations traversed by a borehole, the combination comprising a main electrode mounted for movement longitudinally of a borehole, electric source means coupled to said main electrode and to a remote current return point for passing survey current into formations adjacent said main electrode, an auxiliary electrode including portions spaced above and below said main electrode, a variable gain amplifier having its output coupled to said auxiliary electrode and to a remote current return point, means for energizing said variable gain amplifier to emit auxiliary current from said auxiliary electrode in phase quadrature with said survey current, degenerative feedback means responsive to a potential difference of a single given phase angle less than 90° which is produced by said currents between a pair of points spaced intermediate said main and auxiliary electrodes for deriving a control signal degeneratively to control the gain of said amplifier, said amplifier having a gain which varies substantially as an exponential function of said gain control signal, means for limiting said gain control signal to correspondingly limit variations in said amplifier gain, means responsive to a potential difference of given phase angle less than 90° produced between a point in the vicinity of said main electrode and a remote reference point for deriving a signal representing formation resistivity, and means responsive to the component of the potential difference between said pair of points in phase with said survey current for deriving a second signal representing formation resistivity.

13. In apparatus for investigating earth formations traversed by a borehole, the combination comprising a main electrode mounted for movement longitudinally of a borehole, electric source means coupled to said main electrode and to a current return point for passing a first component of survey current at a reference phase angle and a second substantially smaller component of survey current in phase quadrature therewith into formations adjacent said main electrode, an auxiliary electrode positioned adjacent said main electrode, a variable gain amplifier having its output coupled to said auxiliary electrode and to a current return point, means for energizing said amplifier to emit auxiliary current at the reference phase angle from said auxiliary electrode, degenerative feedback means responsive to a potential difference at the single reference phase angle produced by said currents between a pair of points spaced intermediate said main and auxiliary electrodes for deriving a control signal degeneratively to control the gain of said amplifier, said amplifier having a gain which varies substantially as an exponential function of said gain control signal, means for limiting said gain control signal to correspondingly limit variations in said amplifier gain, and means responsive to a potential difference at said reference phase angle produced between a point in the vicinity of said main electrode and a reference point for deriving a signal representing formation resistivity.

14. In apparatus for investigating earth formations traversed by a borehole, the combination comprising a main electrode mounted for movement longitudinally of a borehole, electric source means, circuit means including a resistor and a reactance shunting said resistor and having a substantially higher impedance, said circuit means coupling said electric source means to said main electrode and to a remote current return point for passing survey current having a relatively small component in phase quadrature with a component at a reference phase angle into formations adjacent said main electrode, an auxiliary electrode including portions spaced above and below said main electrode, a variable gain amplifier having its output coupled to said auxiliary electrode and to a remote current return point, means for energizing said amplifier to emit auxiliary current at said reference phase angle from said auxiliary electrode, degenerative feedback means responsive to a potential difference at said single reference phase angle produced by said currents between a pair of points spaced intermediate said main and auxiliary electrodes for deriving a control signal degeneratively to control the gain of said amplifier, said amplifier having a gain which varies substantially as an exponential function of said gain control signal, means for limiting said gain control signal to correspondingly limit variations in said amplifier gain, and means responsive to a potential difference at said reference phase angle produced between a point in the vicinity of said main electrode and a remote reference point for deriving a signal representing formation resistivity.

15. In apparatus for investigating earth formations traversed by a borehole, the combination comprising a main electrode mounted for movement longitudinally of a borehole, electric source means coupled to said main electrode and to a current return point for passing survey current into formations adjacent said main electrode, an auxiliary electrode positioned adjacent said main electrode, a variable gain amplifier having its output coupled to said auxiliary electrode and to a current return point, means for energizing said amplifier to emit auxiliary current from said auxiliary electrode in phase with said survey current, degenerative feedback means responsive to a potential difference produced by said currents between a pair of points spaced intermediate said main and auxiliary electrodes for deriving a signal degeneratively to control the gain of said amplifier, means for limiting said signal to correspondingly limit variations in said amplifier gain, filter means for limiting the rate of variation in said amplifier gain, and means responsive to a potential difference of given phase produced between a point in the vicinity of said main electrode and a reference point for deriving a signal representing formation resistivity.

16. In apparatus for investigating earth formations traversed by a borehole, the combination comprising a main electrode mounted for movement longitudinally of a borehole, electric source means coupled to said main electrode and to a current return point for passing survey current at a reference phase angle into formations adjacent said main electrode, an auxiliary electrode positioned adjacent said main electrode, a variable gain amplifier having its output coupled to said auxiliary electrode and to a current return point, means for energizing said amplifier to emit auxiliary current in phase with said survey current from said auxiliary electrode, degenerative feedback means responsive to a potential difference produced by and in phase with said currents between a pair of points spaced intermediate said main and auxiliary electrodes for deriving a control signal degeneratively to control the gain of said amplifier, means for limiting said gain control signal to correspondingly limit variations in said amplifier gain, said amplifier having a gain which varies substantially as an exponential function of the gain control signal derived from said limiting means, and means responsive to a potential difference at said reference phase angle produced between a point in the vicinity of said main electrode and a reference point for deriving a signal representing formation resistivity.

17. In apparatus for investigating earth formations traversed by a borehole, the combination comprising a main electrode mounted for movement longitudinally of a borehole, electric source means coupled to maid main electrode and to a remote current return point for passing survey current into formations adjacent said main electrode, an auxiliary electrode including portions spaced above and below said main electrode, a variable gain amplifier having its output coupled to said auxiliary electrode and to a remote current return point, means for energizing said variable gain amplifier to emit auxiliary current in phase with said survey current from said auxiliary electrode, a pair of measuring electrodes spaced intermediate said main and auxiliary electrodes across which a potential difference is developed by said currents, means for amplifying said potential difference, means for limiting the amplified version of said potential difference, detector means for deriving a rectified version of said amplified and limited potential difference, filter means having a relatively long time constant for coupling said detector means to said variable gain amplifier to complete a degenerative gain control loop tending to minimize said potential difference, and means responsive to a potential difference produced in phase with said currents between a point in the vicinity of said measuring electrodes and a remote reference point for deriving a signal representing formation resistivity.

18. A method of investigating earth formations traversed by a borehole comprising: passing a survey current having a constant phase angle between a point in the borehole and a current return point; passing an auxiliary current having a different constant phase angle between a location in the vicinity of said point and a current return point; adjusting the amplitude of one of said currents until a region of substantially zero potential difference is established in the vicinity of said point at a predetermined phase angle; and obtaining indications of the potential difference between a location in the vicinity of said point and a reference point spaced apart therefrom at a known phase angle relative to said predetermined phase angle.

19. A method of investigating earth formations traversed by a borehole comprising: passing a survey current having a constant phase angle between a point in the borehole and a current return point; passing an auxiliary current having a different constant phase angle between a location in the vicinity of said point and a current return point; adjusting the amplitude of one of said currents until a region of substantially zero potential difference is established in the vicinity of said point at a predetermined time instant during each cycle of the survey current; and obtaining indications of the potential difference between a location in the vicinity of said point and a reference point spaced apart therefrom at known time instants relative to said predetermined time instants.

20. In apparatus for investigating earth formations traversed by a borehole, the combination comprising: means for passing a survey current having a constant phase angle between a first point in the borehole and a current return point; means for passing an auxiliary current having a different constant phase angle between a location in the vicinity of said first point and a current return point; degenerative feedback means responsive to a potential difference of a single given phase produced by said currents between a point in the vicinity of said first point and a reference point spaced apart therefrom, this feedback means being coupled to one of said current-passing means for degeneratively controlling the amplitude of the current thereof to reduce said potential difference substantially to zero; and means responsive to a potential difference of a single given phase produced between a point in the vicinity of said first point and a reference point spaced apart therefrom for deriving a signal representing formation resistivity.

21. In apparatus for investigating earth formations traversed by a borehole, the combination comprising: means for passing survey current from a point in the borehole into adjacent earth formations; means for emitting auxiliary current in the borehole in the vicinity of said point for controlling the current flow pattern of said survey current; control means responsive to the resulting potentials at a location in the vicinity of said point for adjusting one of said currents to maintain a desired survey current pattern; means for introducing a phase difference between the survey and auxiliary currents to enable more sensitive and stable control over the survey current pattern; and means responsive to the flow of at least one of said currents for providing indications representative of formation resistivity.

22. A method of investigating earth formations traversed by a borehole comprising: passing survey current between a point in the borehole and a current return point; passing auxiliary current between a location in the vicinity of said point and a current return point with a phase which differs from the phase of said survey current; adjusting one of said currents until a region of minimum potential difference is established in the vicinity of said point at a predetermined phase angle; and obtaining indications representative of the flow of said currents thereby to obtain a measure of formation resistivity.

23. In apparatus for investigating earth formations traversed by a borehole, the combination comprising: means for passing a first current of predetermined frequency from a point in the borehole into adjacent earth formations; means for emitting a second current of the same frequency in the borehole in the vicinity of said point; means for introducing a phase difference between said currents; and means responsive to the flow of said currents for providing indications representative of formation resistivity.

24. In apparatus for investigating earth formations traversed by a borehole, the combination comprising: means for passing a first current of predetermined frequency from a point in the borehole into adjacent earth formations; means for emitting a second current of the same frequency in the borehole in the vicinity of said point with a phase which differs from the phase of said first current; and means responsive to the flow of said currents for providing indications representative of formation resistivity.

References Cited in the file of this patent

UNITED STATES PATENTS

| | | |
|---|---|---|
| 2,712,627 | Doll | July 5, 1955 |
| 2,712,628 | Doll | July 5, 1955 |
| 2,712,629 | Doll | July 5, 1955 |
| 2,712,630 | Doll | July 5, 1955 |
| 2,712,631 | Fure | July 5, 1955 |
| 2,779,913 | Waters | Jan. 29, 1957 |